(12) United States Patent
Liang et al.

(10) Patent No.: US 11,119,651 B2
(45) Date of Patent: Sep. 14, 2021

(54) METHOD FOR DISPLAYING MULTI-TASK MANAGEMENT INTERFACE, DEVICE, TERMINAL AND STORAGE MEDIUM

(71) Applicant: BEIJING XIAOMI MOBILE SOFTWARE CO., LTD., Beijing (CN)

(72) Inventors: Zhe Liang, Beijing (CN); Zhenzhou Lu, Beijing (CN); Xiaodong Li, Beijing (CN); Lan Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/585,970

(22) Filed: Sep. 27, 2019

(65) Prior Publication Data

US 2020/0174662 A1 Jun. 4, 2020

(30) Foreign Application Priority Data

Nov. 30, 2018 (CN) .......................... 201811459870.X

(51) Int. Cl.
*G06F 3/0488* (2013.01)
*G06F 9/451* (2018.01)
(Continued)

(52) U.S. Cl.
CPC ........ *G06F 3/04886* (2013.01); *G06F 1/1641* (2013.01); *G06F 3/0482* (2013.01);
(Continued)

(58) Field of Classification Search
CPC .... G06F 3/04886; G06F 1/1641; G06F 9/451; G06F 3/0482; G06F 3/0483;
(Continued)

(56) References Cited

U.S. PATENT DOCUMENTS

| | | | |
|---|---|---|---|
| 2011/0209058 A1* | 8/2011 | Hinckley | G06F 3/04883 715/702 |
| 2012/0220340 A1* | 8/2012 | Sirpal | G09G 5/14 455/566 |

(Continued)

FOREIGN PATENT DOCUMENTS

| | | |
|---|---|---|
| CN | 105843574 A | 8/2016 |
| CN | 106201181 A | 12/2016 |

(Continued)

OTHER PUBLICATIONS

First Office Action of the Chinese Application No. 201811459870.X, dated Mar. 2, 2020 with English translation, (15p).

(Continued)

*Primary Examiner* — Justin R. Blaufeld
(74) *Attorney, Agent, or Firm* — Arch & Lake LLP

(57) ABSTRACT

A method for displaying a multi-task management interface, a device, a terminal and a storage medium are provided. The method includes receiving a touch operation acting on a target screen region, where the target screen region is the first screen region or the second screen region; and displaying a multi-task management interface based on the touch operation, where the multi-task management interface is configured to display at least one running application that is in a running state.

13 Claims, 16 Drawing Sheets

(51) Int. Cl.
*G06F 3/0482* (2013.01)
*G06F 3/0483* (2013.01)
*G06F 1/16* (2006.01)
*H04M 1/72469* (2021.01)
*H04M 1/02* (2006.01)

(52) U.S. Cl.
CPC ............ *G06F 3/0483* (2013.01); *G06F 9/451* (2018.02); *H04M 1/72469* (2021.01); *G06F 1/1616* (2013.01); *G06F 1/1626* (2013.01); *G06F 2203/04803* (2013.01); *H04M 1/0214* (2013.01); *H04M 1/0268* (2013.01)

(58) Field of Classification Search
CPC ................. G06F 1/1616; G06F 1/1626; G06F 2203/04803; H04M 1/0214; H04M 1/0268
See application file for complete search history.

(56) References Cited

U.S. PATENT DOCUMENTS

| | | | | |
|---|---|---|---|---|
| 2013/0067392 A1* | 3/2013 | Leonard | ................ | G06F 3/0486 715/784 |
| 2013/0321340 A1* | 12/2013 | Seo | ................ | H04M 1/724 345/174 |
| 2014/0218321 A1* | 8/2014 | Lee | ................ | G06F 1/1643 345/173 |
| 2015/0143258 A1 | 5/2015 | Carolan et al. | | |
| 2015/0309691 A1 | 10/2015 | Seo et al. | | |
| 2015/0338888 A1* | 11/2015 | Kim | ................ | G06F 3/04886 345/156 |
| 2015/0378503 A1 | 12/2015 | Seo et al. | | |
| 2016/0246559 A1* | 8/2016 | Jung | ................ | G06F 1/169 |
| 2017/0052698 A1 | 2/2017 | Seo et al. | | |
| 2017/0075640 A1* | 3/2017 | Chun | ................ | G06F 3/04847 |
| 2018/0081219 A1* | 3/2018 | Kim | ................ | G02F 1/13338 |
| 2019/0042066 A1* | 2/2019 | Kim | ................ | G06F 3/04817 |
| 2019/0272091 A1 | 9/2019 | Seo et al. | | |

FOREIGN PATENT DOCUMENTS

| | | |
|---|---|---|
| CN | 106527944 A | 3/2017 |
| CN | 106569722 A | 4/2017 |
| CN | 108170342 A | 6/2018 |
| EP | 2674834 A2 | 12/2013 |
| EP | 3335097 A1 | 6/2018 |

OTHER PUBLICATIONS

Extended European Search Report in the European Application No. 19204815.5, dated Apr. 29, 2020, (8p).

Second Office Action of the Chinese Application No. 201811459870.X, dated Aug. 19, 2020 with English translation (17p).

* cited by examiner

METHOD FOR DISPLAYING MULTI-TASK MANAGEMENT INTERFACE, DEVICE, TERMINAL AND STORAGE MEDIUM

CROSS-REFERENCE TO RELATED APPLICATION

The present application is based on and claims benefit of Chinese Patent Application No. 201811459870.X filed on Nov. 30, 2018, the contents of which are hereby incorporated by reference in its entirety.

TECHNICAL FIELD

The present disclosure relates to the field of terminal technologies, and in particular, to a method for displaying a multi-task management interface, a device, a terminal, and a storage medium.

BACKGROUND

Currently, most cellphones support a multi-task mode in which multiple applications are allowed to run simultaneously.

For traditional single-screen cellphones, a user can click on, slide or long-press a button located in the center of the bottom of the cellphone screen to invoke a multi-task management interface. The multi-task management interface is used to display running applications that are currently running in the cellphone. For example, the multi-task management interface includes an interface thumbnail of each running application. The above running applications include applications running on the foreground and applications running in the background.

For folding-screen cellphones, due to their large screens, if the multi-task management interface is still invoked in a traditional method, the user needs to hold the cellphone in one hand, and touch the button in the center of the bottom of the screen with the other hand, thus it is inconvenient to operate.

SUMMARY

According to a first aspect of the embodiments of the present disclosure, there is provided a method for displaying a multi-task management interface. The method is applied in a terminal with a folding display screen including a first screen region and a second screen region that are foldable. The method includes: a touch operation acting on a target screen region is received, the target screen region being the first screen region or the second screen region, and a multi-task management interface is displayed based on the touch operation, the multi-task management interface is configured to display at least one running application that is in a running state.

According to a second aspect of the embodiments of the present disclosure, there is provided a device for displaying a multi-task management interface. The device is applied in a terminal with a folding display screen including a first screen region and a second screen region that are foldable. The device includes: a processor; and a memory configured to store an instruction executable by the processor, wherein the processor is configured to receive a touch operation acting on a target screen region, the target screen region being the first screen region or the second screen region; and display a multi-task management interface based on the touch operation, the multi-task management interface is configured to display at least one running application that is in a running state.

According to a third aspect of the embodiments of the present disclosure, there is provided a tangible, non-transitory computer-readable storage medium having stored thereon computer programs that, when executed by a processor, cause the processor to implement a method for displaying a multi-task management interface, the method being applied in a terminal with a folding display screen including a first screen region and a second screen region that are foldable, the method including: receiving a touch operation acting on a target screen region, the target screen region being the first screen region or the second screen region; and displaying the multi-task management interface based on the touch operation, wherein the multi-task management interface is configured to display at least one running application that is in a running state.

It is to be understood, the above general description and the following detailed description are merely examples and explanatory and not intended to limit the present disclosure.

DETAILED DESCRIPTION

Figure 1:
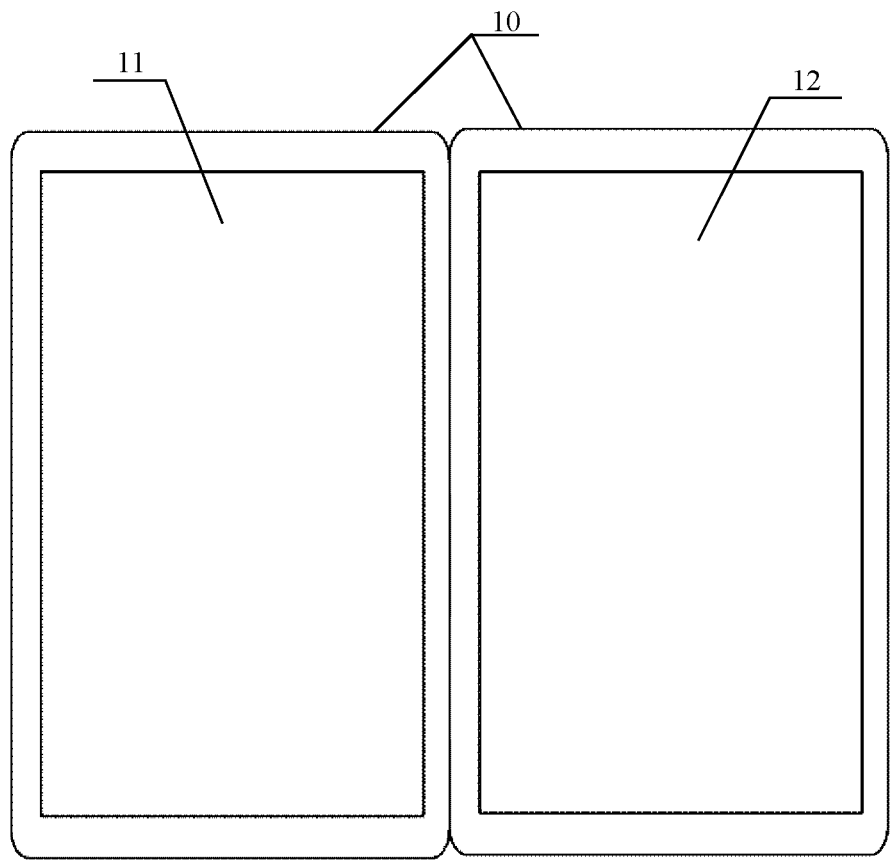
FIG. 1 shows a structural diagram of a folding display screen, according to an example.

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the invention. Instead, they are merely examples of apparatuses and methods consistent with aspects related to the invention as recited in the appended claims.

The terminology used in the present disclosure is for the purpose of describing particular embodiments only and is not intended to limit the present disclosure. As used in the present disclosure and the appended claims, the singular forms "a", "an" and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first", "second", "third", etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

An execution subject of each step of the method provided by the embodiment of the present disclosure may be a terminal. The above terminal may be an electronic device such as a cellphone, a tablet computer, an e-book reader, a multimedia playback device, a wearable device, a portable laptop computer, or the like.

The terminal has a folding display screen. The folding display screen is a foldable. In addition to the display capabilities possessed by traditional display screens, the folding display screen also has foldability. The folding display screen may include both a folded state and an expanded state. When the folding display screen is in the folded state, the space occupied by the terminal may be reduced; when the folding display screen is in the expanded state, a user can be provided with a larger usable area of the display screen.

According to an embodiment, the folding display screen is foldable and includes a first screen region and a second screen region. The folding display screen may be designed to be a left-to-right folding display screen or an up-to-down folding display screen and may be also designed to be an outwards folding display screen or an inwards folding display screen or a combination thereof, which is not limited in the embodiments of the present disclosure.

In the following, the folding display screen designed to be a left-to-right folding display screen is taken as an example to introduce two structural forms of the folding display screen:

FIG. 1 is a structural diagram showing the front of a folding display screen 10. A first screen region 11 and a second screen region 12 of the folding display screen 10 are respectively two screens, which are connected by a connecting mechanism. The above connecting mechanism may be a hinge, a glue, or even a flexible screen, which is not limited in the embodiments of the present disclosure. The attributes, such as materials, sizes, and shapes of the two screens may be the same or different, which are not limited in the embodiments of the present disclosure. For example, both screens may be rigid screens or flexible screens, or one of the two screens may be a rigid screen, and the other may be a flexible screen. For another example, one of the two screens may be larger and used as the main screen, and the other may be smaller and used as a secondary screen. For another example, one of the two screens may be thicker, and the other may be thinner.

The folding display screen 10 includes a one-piece screen, which may be a one-piece flexible screen or a screen formed by seamlessly combining a flexible screen and a rigid screen through a related manufacturing process.

Figure 2:
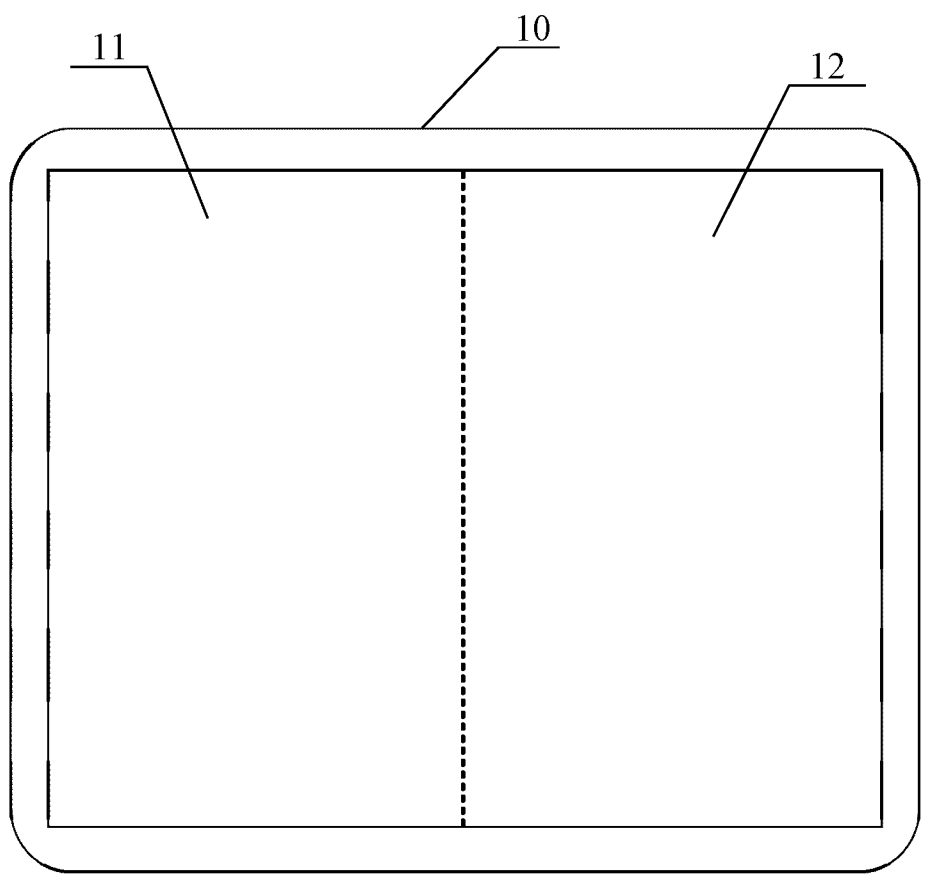
FIG. 2 shows a structural diagram of a folding display screen, according to an example.

FIG. 2 is a structural diagram showing the front of a folding display screen 10. The folding display screen 10 is a one-piece flexible screen, the folding display screen 10 may be divided into a first screen region 11 and a second screen region 12, wherein the first screen region 11 and the second screen region 12 may have the same size or different sizes. At this time, because the folding display screen 10 is a one-piece flexible screen, in other embodiments, it can be divided into more screen regions.

Figure 3:
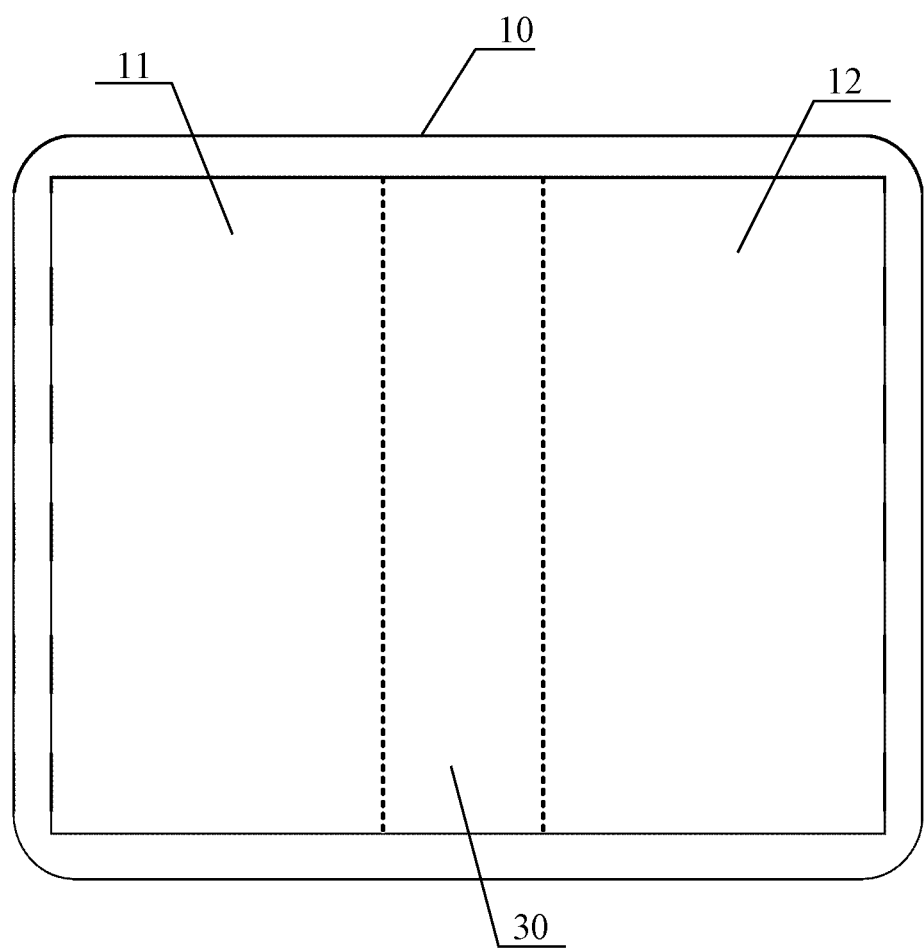
FIG. 3 shows a structural diagram of a folding display screen, according to an example.

FIG. 3 is a structural diagram showing the front of a folding display screen 10. The folding display screen 10 is formed by seamlessly splicing a flexible screen and a rigid screen, and the folding display screen includes a first screen region 11, a second screen region 12, and a third screen region 30. Where the third screen region 30 is a flexible screen, and at least one of the first screen region 11 and the second screen region 12 is a rigid screen.

Figure 4:
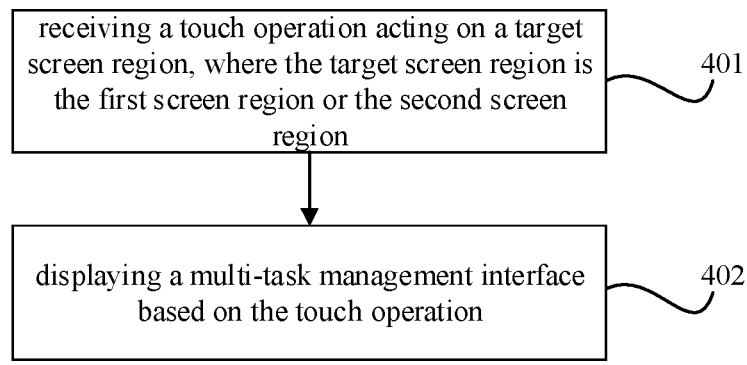
FIG. 4 is a flowchart of a method for displaying a multi-task management interface, according to an example.

FIG. 4 is a flowchart of a method for displaying a multi-task management interface according to an example. In the embodiment, the method applied for the terminal with the folding display screen is mainly taken as an example, the folding display screen is foldable and includes a first screen region and a second screen region. The method may include the following operations:

At 401, a touch operation acting on a target screen region is received, where the target screen region is the first screen region or the second screen region.

In the embodiments of the disclosure, the folding display screen also has a function of receiving touch operations. For example, the folding display screen includes a touch sensing layer, by which a touch operation such as clicking, sliding, pressing, or the like is received. A user may perform the above touch operation by a finger or a stylus.

According to an embodiment, the touch operation for triggering to display a multi-task management interface is a sliding operation. The terminal receives a sliding operation acting on a target screen region. For example, the sliding operation may be an operation of sliding upward from the bottom of the target screen region or operation of sliding inward from a side edge of the target screen region. In some other embodiments, the touch operation for triggering to display the multi-task management interface may also be a click operation (such as a single click, a double click, a triple-click, etc.) or a pressing operation, which is not limited in the embodiments of the present disclosure.

In addition, an explanation of the folding display screen and the first screen region and the second screen region in the folding display screen may be referred hereinbefore, and no further details are described here.

At 402, a multi-task management interface is displayed based on the touch operation.

The multi-task management interface is configured to display at least one running application that is in a running state. According to an embodiment, the multi-task management interface is configured to display at least one running application that is in a running state, which may include a foreground running application and a background running application. Where the foreground running application refers to an application running in the foreground of the terminal when the above touch operation is received, that is, a user interface of the application is displayed in the folding display screen of the terminal. The background running application refers to an application running in the background of the terminal when the above touch operation is received; that is, a user interface of the application is not displayed in the folding display screen of the terminal, but the process of the application is in the running state.

According to an embodiment, the multi-task management interface includes a tab for each running application. The tab of the running application is configured for uniquely identifying the running application. The tab of the running application may be a user interface of the running application, and may also be a thumbnail of the running application or another display form that can identify the application. This can also include a tag, label, or icon. It is not limited in the embodiments of the present disclosure. The tab for each running application can be distributed in the form of an array. When the user clicks on the tab of the application, the application may be switched to run in the foreground. The user may also slide the tab of the application up or click the close button on the tab to close the running application.

According to an embodiment, except for displaying at least one running application that is in a running state, the multi-task management interface is also configured to display at least one running application that is in a running state in a target device. For example, the target device may be a device having an association relationship with the terminal. For example, the association relationship is that the target device is in a network connection with the terminal, or that the target device is in the same local area network as the terminal. For example, if a network connection is established between the terminal and a smart television (TV), the terminal can interact with the smart TV through the network connection, for example, to control the smart TV. The multi-task management interface displayed by the terminal includes a tab of the running application in the terminal and also includes a tab of the running application in the smart TV.

In addition, after receiving the touch operation acting on the target screen region, the terminal may detect whether the touch operation meets the preset condition. If the touch operation meets the preset condition, the terminal displays the multi-task management interface. The preset condition described above refers to a preset condition required to be met for triggering to display the multi-task management interface. For example, the preset condition may include a touch operation is acted on a target response region in the target screen region. The target response region is a region for receiving a touch operation for invoking the multi-task management interface. An area of the target response region is smaller than that of the target screen region, and the target response region may also be disposed in a position that is easy to touch in the folding display screen. For example, when a target response region is disposed of in a region below the left/right edge of the folding display screen, a user can directly call the multi-task management interface by performing a touch operation in a lower-left corner or a lower right corner of the folding display screen. In some other embodiments, a target response region may also be disposed of in other regions in the folding display screen, which is not limited in the embodiments of the present disclosure.

In a possible implementation, the above target response region includes a first response region and a second response region. Where each response region is located in its corresponding screen region. For example, where the first response region is located in the first screen region, and the second response region is located in the second screen region, which may be referred to as a description of FIG. 6 hereinafter, described below.

In another possible implementation, the above target response region includes a first response region, a second response region, and a third response region. Where each response region is located in its corresponding screen region. For example, where the first response region is located in the first screen region, the second response region is located in the second screen region, one portion of the third response region is located in the first screen region, and the other portion is located in the second screen area, and the first response region, the second response region, and the third response region are not overlapped, which may be referred to a description of FIG. 13 hereinafter.

After the multi-task management interface is invoked, the terminal obtains a selection instruction corresponding to the target application in the multi-task management interface, and displays a user interface of the target application. The above target application is any of the running applications in the multi-task management interface. According to an embodiment, the terminal may display the user interface of the target application in the folding display screen in a full-screen display manner, may display the user interface of the target application in the first screen region, and may also display the user interface of the target application in the second screen region, which is not limited in the embodiment.

A practical application scenario of the present disclosure is exemplified below. An application A is running in the foreground in a cellphone with a folding display screen. A user sees an attraction introduced in the application A and wants to know a specific route to the attraction from a current location, which needs to be looked up in an application B. Therefore, the user needs to invoke a multi-task management interface to launch the application B that is running in the background. At this time, the user may directly perform a sliding operation from bottom to top in the folding display screen by a finger of a hand holding the cellphone. After receiving the above sliding operation, the terminal displays the multi-task management interface. Then, the user finds the tab of the application B in the multi-task management interface, clicks on the tab of the application B, and invokes the application B from the background to the foreground. Due to the fact that the user may directly perform the touch operation in the first screen region or the second screen region in the folding display screen to invoke the multi-task management interface by using the finger, which is on the top of the screen, of the hand holding the cellphone, there is no need to adopt a scheme in which a button in the center of the screen is traditionally required to be touched. In this way, the operation for invoking the multi-task management interface is made to be more convenient.

Some embodiments may allow, for a terminal with a folding display screen, a method for displaying a multi-task management interface is provided. After receiving a touch operation located in a first screen region or a second screen region of the folding display screen, the terminal displays the multi-task management interface based on the touch operation, without adopting a scheme in which a button in the center of the screen is traditionally required to be touched. In this way, the operation for invoking the multi-task management interface is made to be more convenient.

Figure 5:
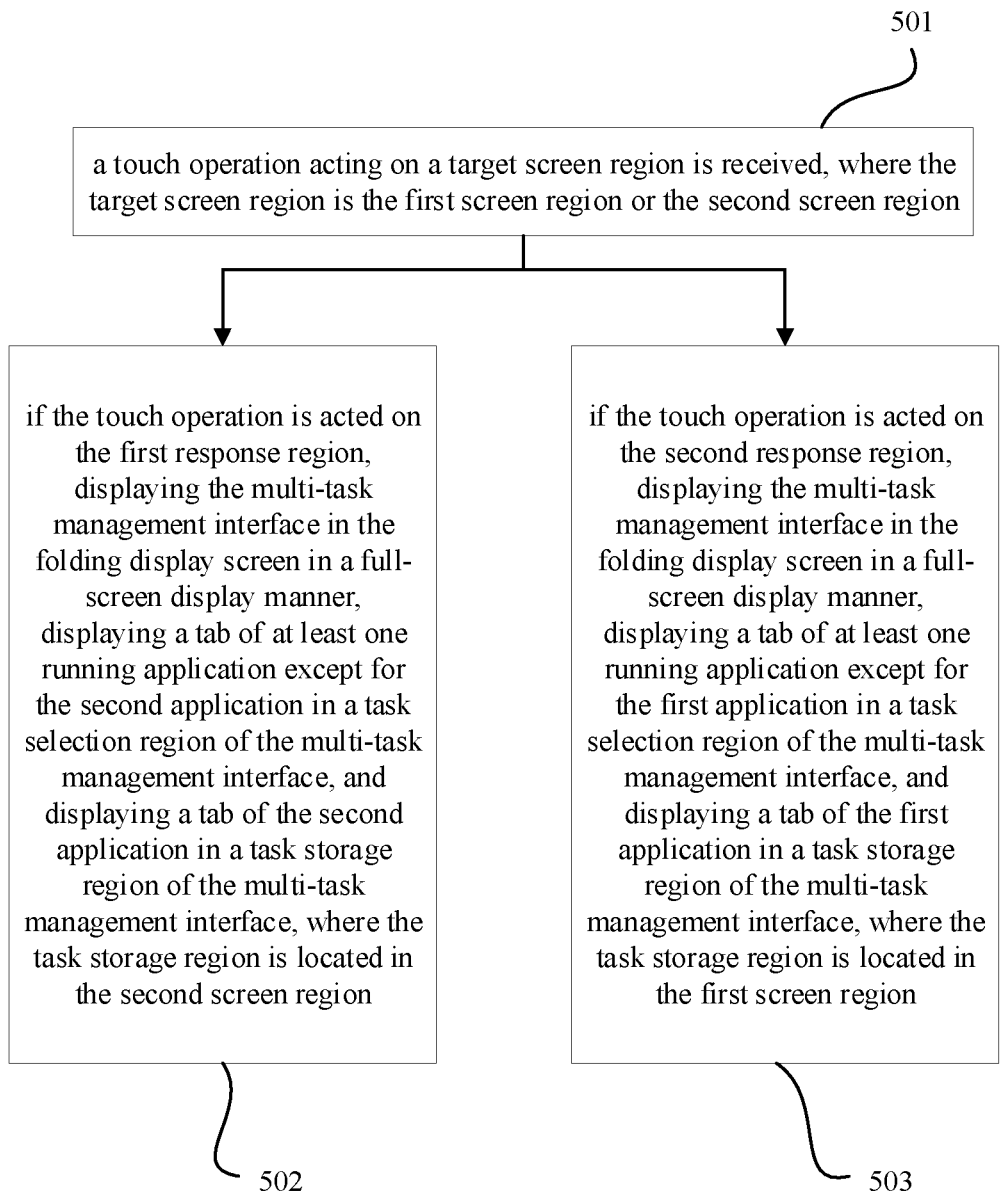
FIG. 5 is a flowchart of a method for displaying a multi-task management interface, according to an example.

FIG. 5 is a flowchart of a method for displaying a multi-task management interface according to an example. In the embodiment, the method applied for the terminal with the folding display screen is mainly taken as an example, the folding display screen is foldable and includes a first screen region and a second screen region. The method may include the following operations:

At 501, a touch operation acting on a target screen region is received, where the target screen region is the first screen region or the second screen region.

In the embodiment, the folding display screen includes a first response region and a second response region, which are configured for responding to the touch operation. Where each response region is located in its corresponding screen region. For example, where the first response region is located in the first screen region, and the second response region is located in the second screen region. For example, combined with reference to FIG. 6, described below, a folding display screen 10 of a terminal includes a first screen region 11, in which a response region 13 is located, and a second screen region 12, in which a second response region 14 is located.

Figure 6:
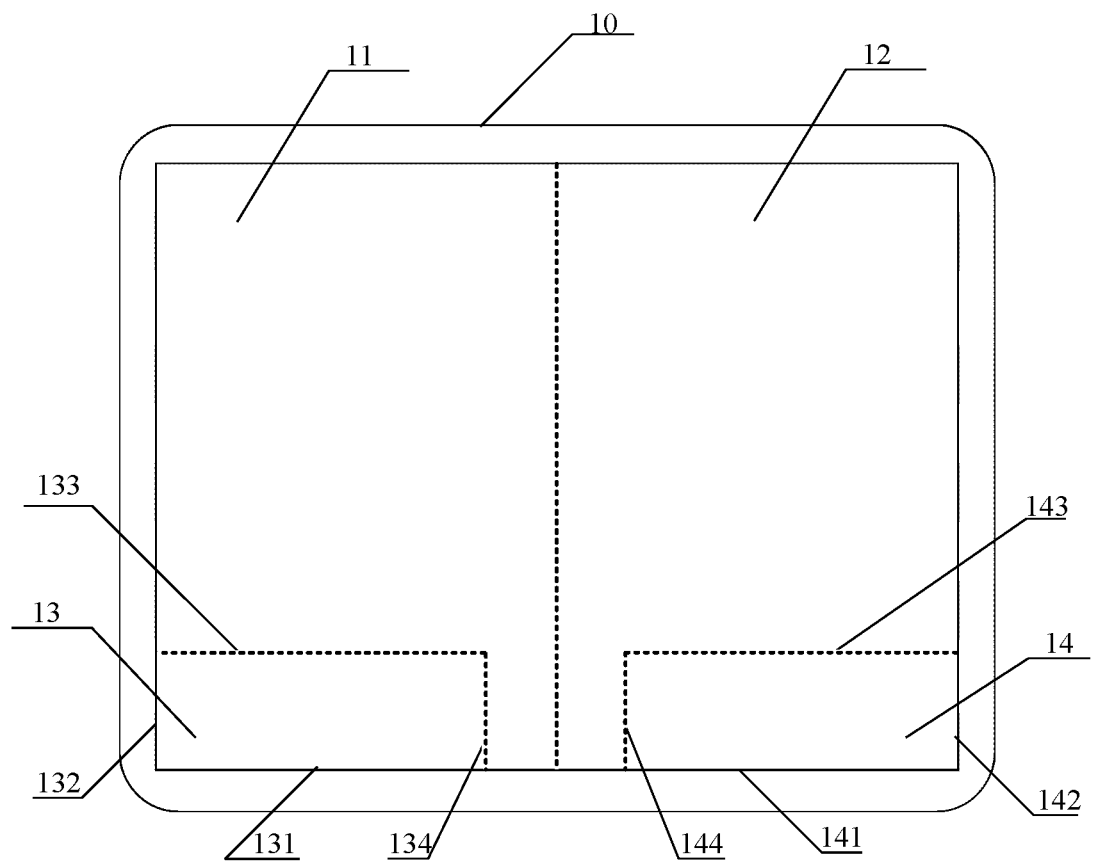
FIG. 6 shows a distribution diagram of response regions in a folding display screen, according to an example.

FIG. 6 is a structural diagram showing the front of a folding display screen 10. The first response region 13 includes a region enclosed by a bottom edge 131 of the first screen region 11, a side edge 132 of the first screen region 11, a first virtual edge 133 parallel to the bottom edge 131 of the first screen region 11, and a second virtual edge 134 parallel to the side edge 132 of the first screen region 11. The second response region 14 includes a region enclosed by a bottom edge 141 of the second screen region 12, a side edge 142 of the second screen region 12, a first virtual edge 143 parallel to the bottom edge 141 of the second screen region 12, and a second virtual edge 144 parallel to the side edge 142 of the second screen region 12.

The above second virtual edge 134 and the fourth virtual edge 144 may be the same virtual edge, that is, the second virtual edge 134 and the fourth virtual edge 144 are coincident; and may also be two different virtual edges, that is, the second virtual edge 134 and the fourth virtual edge 144 are not coincident. FIG. 6 only shows an example where the second virtual edge 134 and the fourth virtual edge 144 are not coincident.

In the example of FIG. 6, only an example that the first response region 13 is located at the lower-left corner of the first screen region 11 and the second response region 14 is located at the lower right corner of the second screen region 12 is taken. In some other embodiments, a response region may also be close to a side edge of the screen. For example, the first response region 13 is located at the left edge of the first screen region 11, and the second response region 14 is located at the right edge of the second screen region 12. Of course, the response region may be disposed in other easily accessible positions based on actual requirements, which is not limited in the embodiments of the present disclosure.

In addition, in the example of FIG. 6, only an example that the first response region 13 and the second response region 14 have the same size, and both are symmetric in positions in the first screen region 11 and in the second screen region 12 is taken for an example explanation. In some other embodiments, the first response region 13 and the second response region 14 may have different sizes, and the first response region 13 and the second response region 14 may also be asymmetric in position, this does not limited the present disclosure.

Figure 7:
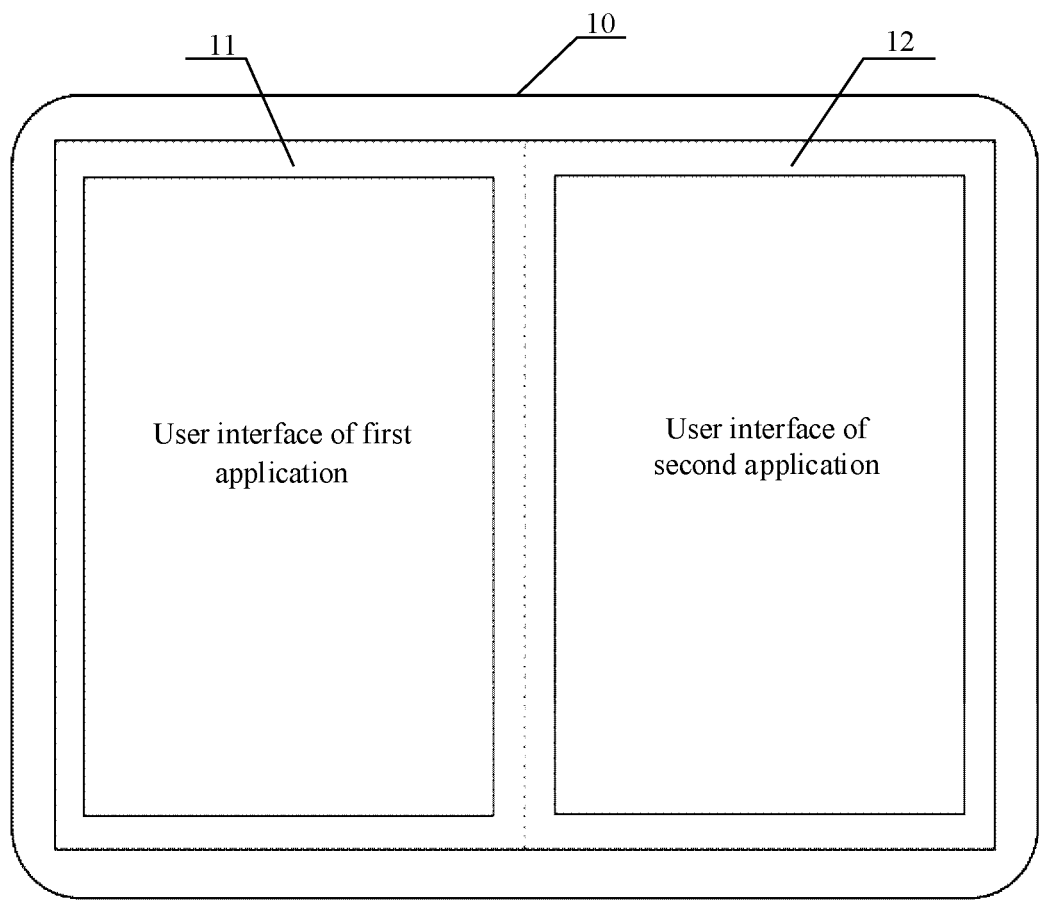
FIG. 7 shows a diagram of a user interface display displaying applications in a folding display screen, according to an example.

In the embodiment, as illustrated in FIG. 7, described below, it is assumed that a user interface of a first application is displayed in the first screen region 11, and a user interface of a second application is displayed in the second screen region 12.

FIG. 7 is a structural diagram showing the front of a folding display screen 10. The first screen region 11 displays a user interface of a first application. The second screen region 12 displays a user interface of a second application.

In an example, the first application and the second application are two different applications. For example, a user interface of a certain social application A is displayed in the first screen region, and a user interface of a certain video application B is displayed in the second screen region.

In another example, the first application and the second application are the same application.

According to an embodiment, the user interface of the first application and the user interface of the second application are two different user interfaces of the same application. For example, a chat session interface of a certain social application A is displayed in the first screen region, and a scan code payment interface of the social application A is displayed in the second screen region.

According to an embodiment, the user interface of the first application and the user interface of the second application are the same user interface of the same application. At this time, the user interface may be displayed in the folding display screen in a full-screen display manner. For example, one portion of the user interface is displayed in the first screen region, and the other portion is displayed in the second screen region. For example, a video playback interface of a video application B is displayed in the folding display screen in a full-screen display manner. The left-half interface of the video playback interface is displayed in the first screen region, and the right-half interface of the video playback interface is displayed in the second screen region.

It is to be noted that an application (such as the first application and the second application referred to above) involved in the embodiments of the present disclosure may be a system application pre-installed before a terminal leaves a factory, and may also be a third-party application installed by a user after a terminal leaves a factory. The above system application includes, but is not limited to, an application such as a desktop, system setting, calendar, weather, clock, application store, or the like. The above third-party application includes, but is not limited to, a social application, an instant messaging application, a map navigation application, a game application, a video application, a shopping application, or the like.

In the embodiment, when the user's touch operation is acted on a response region of the target screen region (such as the first response region of the first screen region or the second response region of the second screen region), the terminal responds to the touch operation and display the multi-task management interface. When the user's touch operation is not located in the response region of the target screen region, the terminal does not respond to the touch operation, or the terminal responds to the touch operation, but does not display the multi-task management interface, but displays another interface, such as a menu display interface, a search interface, a function setting interface, or the like. According to an embodiment, the multi-task management interface includes a task selection region and a task storage region. According to an embodiment, the task selection region is a region for displaying a tab of a running application, and the task storage region is a region for displaying a tab of a running application in a non-target screen region.

At 502, if the touch operation is acted on the first response region, the multi-task management interface is displayed in the folding display screen in a full-screen display manner, a tab of at least one running application except for the second application is displayed in a task selection region of the multi-task management interface, and a tab of the second application is displayed in a task storage region of the multi-task management interface, where the task storage region is located in the second screen region.

At this time, the task selection region displays a tab of the first application, and, according to an embodiment, also displays a tab of a running application other than the first application and the second application. In the embodiments of the present disclosure, the display position of the tab of the first application in the task selection region is not limited. For example, it may be displayed at a first position or another position.

The task storage region may be a region in the second screen region, which is close to the edge of the screen. In addition, the task storage region may be a rectangular, square or another shaped region, which is not limited in the embodiments of the present disclosure.

For example, combined with reference to FIG. 8, described below, when the touch operation is acted on the first response region 13, the task storage region 202 is located in the second screen region 12. The task selection region 201 displays a tab of another running application other than the second application, in which the tab of the first application is included, the task storage region 202 displays the tab of the second application.

Figure 8:
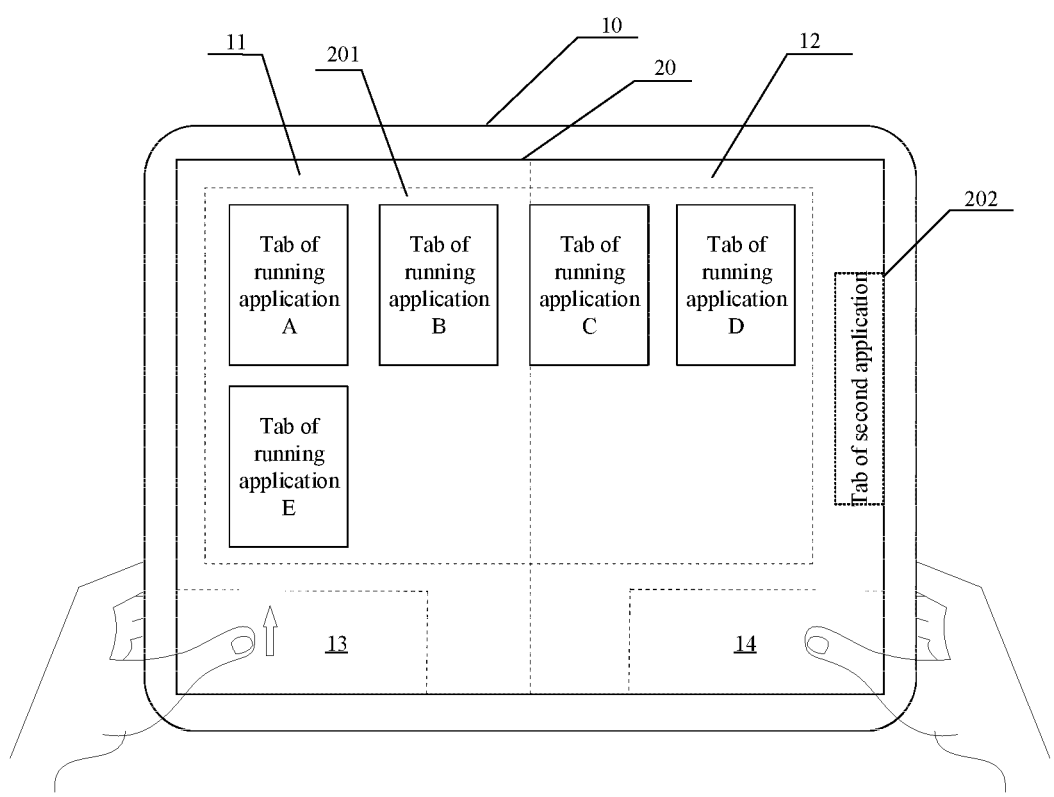
FIG. 8 shows a diagram displaying a multi-tasking management interface when a touch operation is acted on a first response region, according to an example.

FIG. 8 is a structural diagram showing the front of a folding display screen 10. The task selection region 201 displays a tab of an application and the task storage region 202 displays a tab of a different application. The multi-task management interface 20 displays the selection region 201 and task storage region 202 on first screen region 11 and on second screen region 12, respectively.

At 503, if the touch operation is acted on the second response region, the multi-task management interface is displayed in the folding display screen in a full-screen display manner, a tab of at least one running application except for the first application is displayed in a task selection region of the multi-task management interface, and a tab of the first application is displayed in a task storage region of the multi-task management interface, where the task storage region is located in the first screen region.

At this time, the task selection region displays a tab of the second application, and, according to an embodiment, also displays a tab of a running application other than the first application and the second application. In the embodiments of the present disclosure, the display position of the tab of the second application in the task selection region is not limited. For example, it may be displayed at a first position or another position.

The task storage region may be a region in the first screen region, which is close to the edge of the screen. In addition, the task storage region may be a rectangular, square or another shaped region, which is not limited in the embodiments of the present disclosure.

For example, combined with reference to FIG. 9, described below, when the touch operation is acted on the second response region 14, the task storage region 202 is located in the first screen region 11. The task selection region 201 displays a tab of another running application other than the first application, in which the tab of the second application is included, the task storage region 202 displays the tab of the first application.

Figure 9:
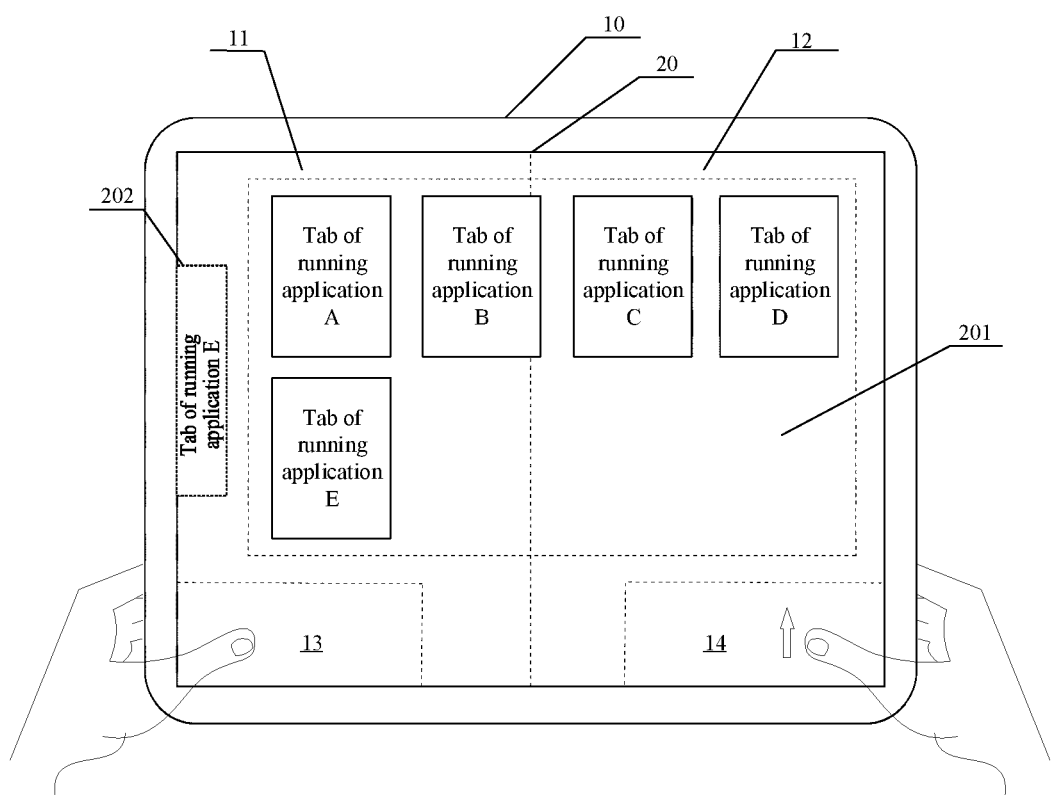
FIG. 9 shows a diagram displaying a multi-task management interface when a touch operation is acted on a first response region, according to an example.

FIG. 9 is a structural diagram showing the front of a folding display screen 10. The task selection region 201 displays a tab of an application and the task storage region 202 displays a tab of a different application. The multi-task management interface 20 displays the task storage region 202 on the first screen region 11 and the selection region 201 on the second screen region 12.

After the multi-task management interface is invoked, the user may select an application that needs to be switched to run in the foreground in the multi-task management interface, so as to display the user interface of the application in the folding display screen. The user may click on a tab of a third application to be displayed in the multi-task management interface displayed by the terminal, and correspondingly, the terminal obtains a selection instruction corresponding to the third application in the task selection region.

Combined with reference to FIG. 10, described below, when the selection instruction of the third application is obtained, if the touch operation is acted on the first response region 13, the terminal displays the user interface of the third application in the first screen region 11, and displays the user interface of the second application in the second screen region 12; whereas before the touch operation for displaying the multi-task management interface is obtained, the first application displayed in the first screen region 11 is transferred to run in the background.

Figure 10:
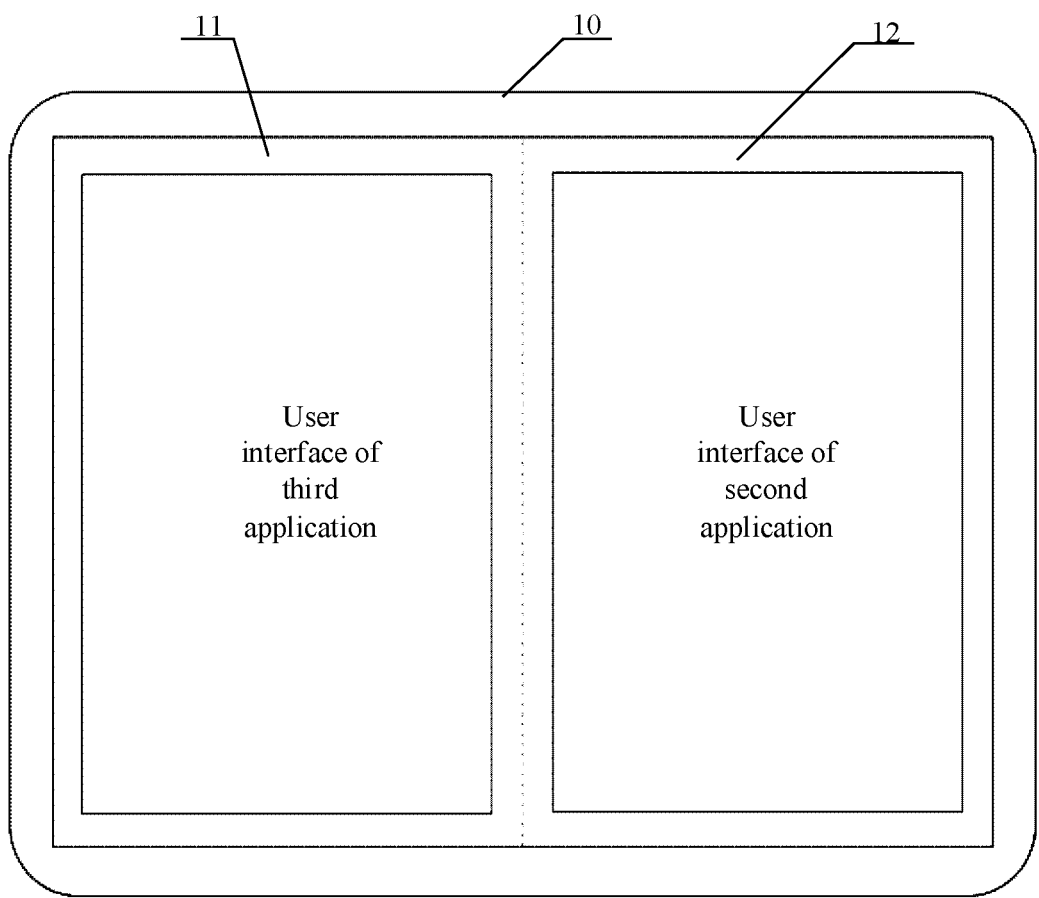
FIG. 10 shows a diagram of a user interface display displaying applications in a folding display screen, according to an example.

FIG. 10 is a structural diagram showing the front of a folding display screen 10. The first screen region 11 displays a user interface of a third application. The second screen region 12 displays a user interface of a second application.

Combined with reference to FIG. 11, described below, When the selection instruction of the third application is obtained, if the touch operation is acted on the second response region 14, the terminal displays the user interface of the third application in the second screen region 12, and displays the user interface of the second application in the first screen region 11; whereas before the touch operation for displaying the multi-task management interface is obtained, the second application displayed in the second screen region 12 is transferred to run in the background.

Figure 11:
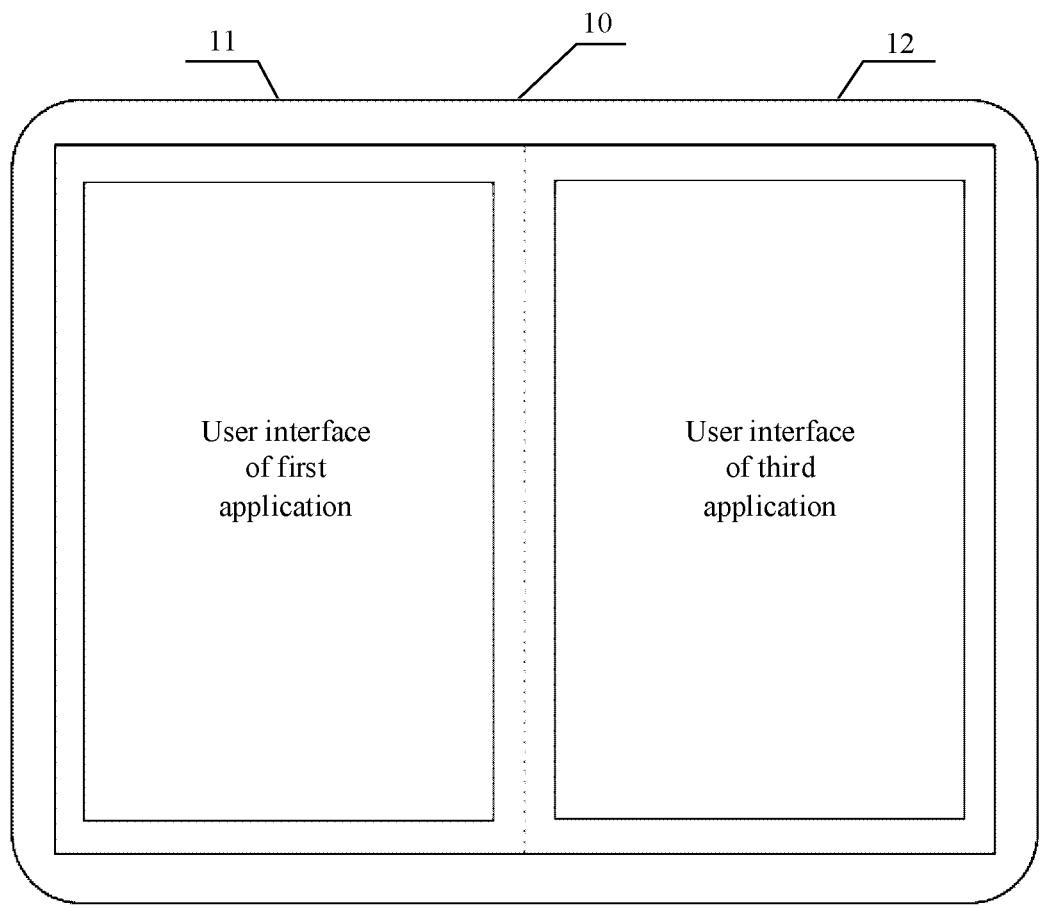
FIG. 11 shows a diagram of a user interface display displaying applications in a folding display screen, according to an example.

FIG. 11 is a structural diagram showing the front of a folding display screen 10. The first screen region 11 displays a user interface of a first application. The second screen region 12 displays a user interface of a third application.

Some embodiments may allow, for a terminal with a folding display screen, a method for displaying a multi-task management interface is provided. After receiving a touch operation located in a first screen region or a second screen region of the folding display screen, the terminal displays the multi-task management interface based on the touch operation, without adopting a scheme in which a button in the center of the screen is traditionally required to be touched. In this way, the operation for invoking the multi-task management interface is made to be more convenient.

In addition, two response regions for responding to the touch operation are disposed of in the first screen region and the second screen region of the folding display screen, respectively. The user may perform a touch operation in the response region of the folding display screen to invoke the multi-task management interface by directly using a finger, which is located on the top of the screen, of a hand holding the cellphone.

Figure 12:
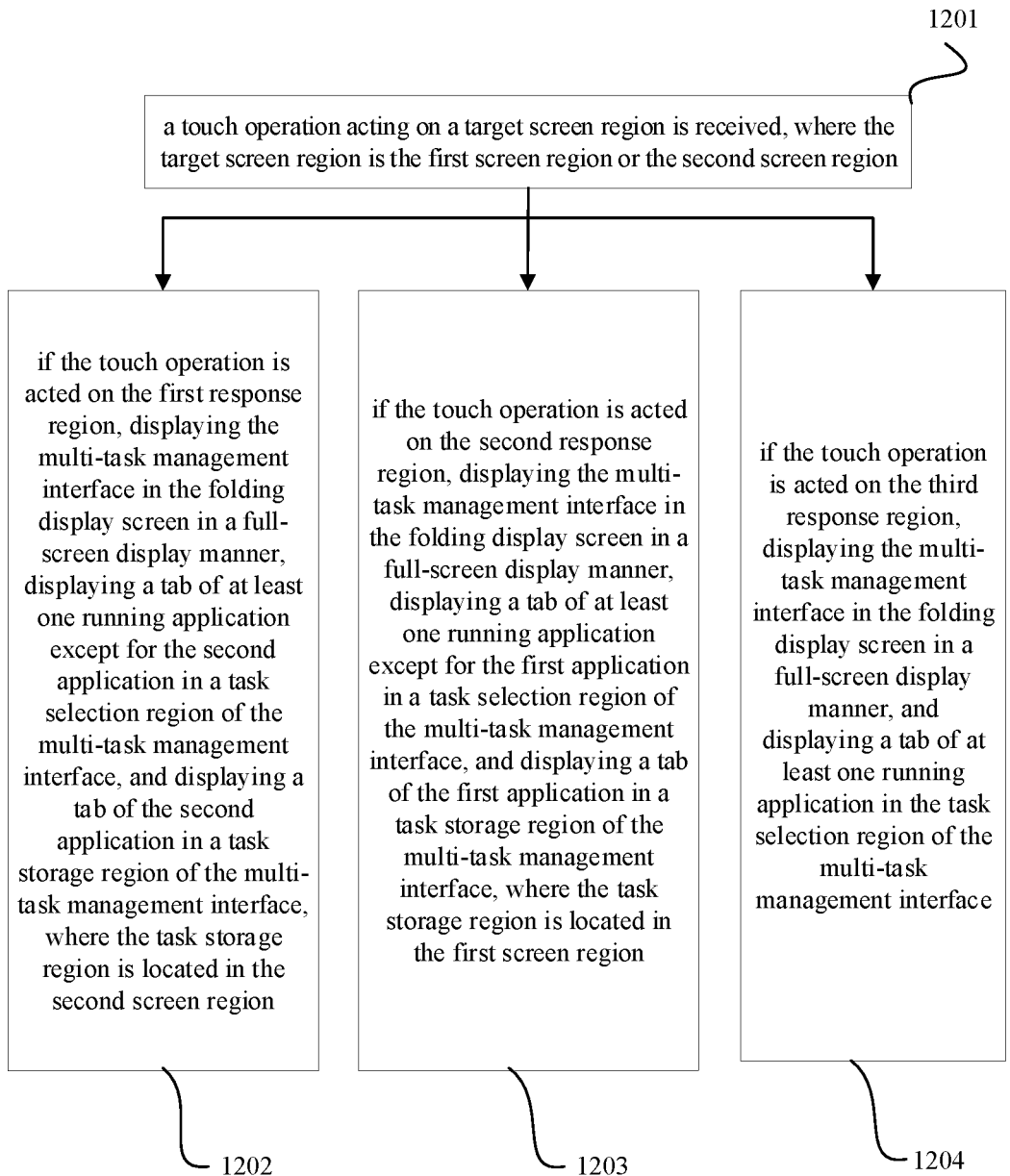
FIG. 12 is a flowchart of a method for displaying a multi-task management interface, according to an example.

FIG. 12 is a flowchart of a method for displaying a multi-task management interface according to an example.

In the embodiment, the method applied for the terminal with the folding display screen is mainly taken as an example, the folding display screen is foldable and includes a first screen region and a second screen region. The method may include the following operations:

At 1201, a touch operation acting on a target screen region is received, where the target screen region is the first screen region or the second screen region.

In the embodiment, the folding display screen includes a first response region, a second response region, and a third response region, which are configured for responding to the touch operation. Where the first response region is located in the first screen region, the second response region is located in the second screen region, one portion of the third response region is located in the first screen region, and the other portion is located in the second screen area, and the first response region, the second response region, and the third response region are not overlapped. For example, combined with reference to FIG. 13, described below, a folding display screen 10 of a terminal includes a first screen region 11 and a second screen region 12, where a response region 13 is located in the first screen region 11, a second response region 14 is located in the second screen region 12, and one portion of the third response region 15 is located in the first screen region 11 and the other portion is located in the second screen region 12.

Figure 13:
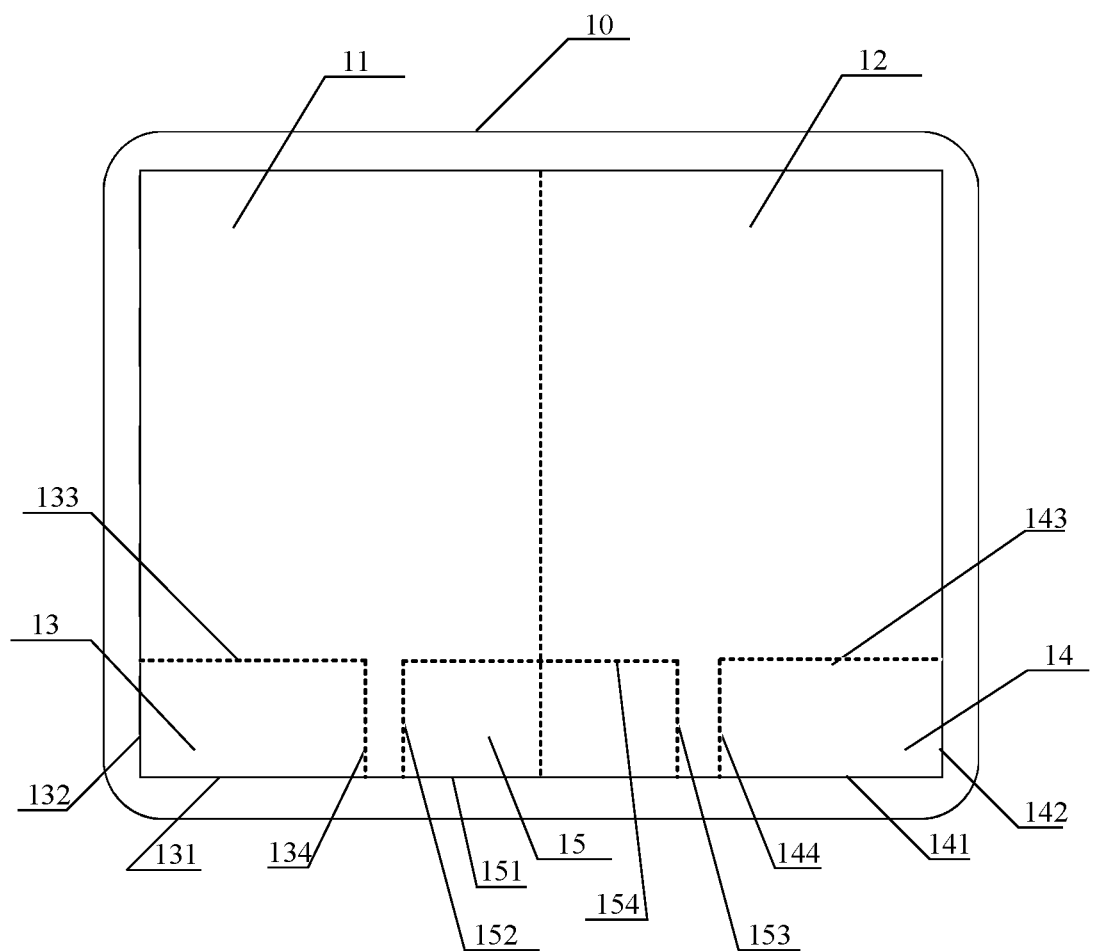
FIG. 13 shows a distribution diagram of response regions in a folding display screen, according to an example.

FIG. 13 is a structural diagram showing the front of a folding display screen 10. The first response region 13 includes a region enclosed by a bottom edge 131 of the first screen region 11, a side edge 132 of the first screen region 11, a first virtual edge 133 parallel to the bottom edge 131 of the first screen region 11, and a second virtual edge 134 parallel to the side edge 132 of the first screen region 11. The second response region 14 includes a region enclosed by a bottom edge 141 of the second screen region 12, a side edge 142 of the second screen region 12, a first virtual edge 143 parallel to the bottom edge 141 of the second screen region 12, and a second virtual edge 144 parallel to the side edge 142 of the second screen region 12. The third response region 15 includes a region enclosed by a bottom edge 151 of the folding display screen 10, a fifth virtual edge 152 located in the first screen region 11, a sixth virtual edge 153 located in the second screen region 12, and a seventh virtual edge 154 parallel to the bottom edge 151 of the folding display screen region 10.

The above second virtual edge 134 and the fifth virtual edge 152 may be the same virtual edge, that is, the second virtual edge 134 and the fifth virtual edge 152 are coincident; and may also be two different virtual edges, that is, the second virtual edge 134 and the fifth virtual edge 152 are not coincident. The above fourth virtual edge 144 and the sixth virtual edge 153 may be the same virtual edge, that is, the fourth virtual edge 144 and the sixth virtual edge 153 are coincident; and may also be two different virtual edges, that is, the fourth virtual edge 144 and the sixth virtual edge 153 are not coincident. FIG. 13 only shows an example where the second virtual edge 134 and the fifth virtual edge 152 are not coincident and the fourth virtual edge 144 and the sixth virtual edge 153 are not coincident.

According to an embodiment, considering the effective touch region of a finger when two hands hold the terminal, the first virtual edge and the third virtual edge has equal length, which is one quarter of the length of the bottom edge of the entire folding display screen; the seventh virtual edge is one-half the length of the bottom edge of the entire folding display screen. Of course, the response region may be sized differently based on actual requirements, which is not limited in the embodiments of the present disclosure.

In the embodiment, it is assumed that a user interface of a first application is displayed in the first screen region, and a user interface of a second application is displayed in the second screen region. In addition, the introduction about a displaying manner of the user interface of the first application and that of the user interface of the second application, and the introduction about the application involved in the embodiment may be referred hereinbefore, and no further details are described herein again.

At 1202, if the touch operation is acted on the first response region, the multi-task management interface is displayed in the folding display screen in a full-screen display manner, a tab of at least one running application except for the second application is displayed in a task selection region of the multi-task management interface, and a tab of the second application is displayed in a task storage region of the multi-task management interface, where the task storage region is located in the second screen region.

This step is consistent with step 502 introduced in the embodiment of FIG. 5 above and no further details are described herein again.

At 1203, if the touch operation is acted on the second response region, the multi-task management interface is displayed in the folding display screen in a full-screen display manner, a tab of at least one running application except for the first application is displayed in a task selection region of the multi-task management interface, and a tab of the first application is displayed in a task storage region of the multi-task management interface, where the task storage region is located in the first screen region.

This step is consistent with step 503 introduced in the embodiment of FIG. 5 above and no further details are described herein again.

At 1024, if the touch operation is acted on the third response region, the multi-task management interface is displayed in the folding display screen in a full-screen display manner, and a tab of at least one running application is displayed in the task selection region of the multi-task management interface.

Figure 14:
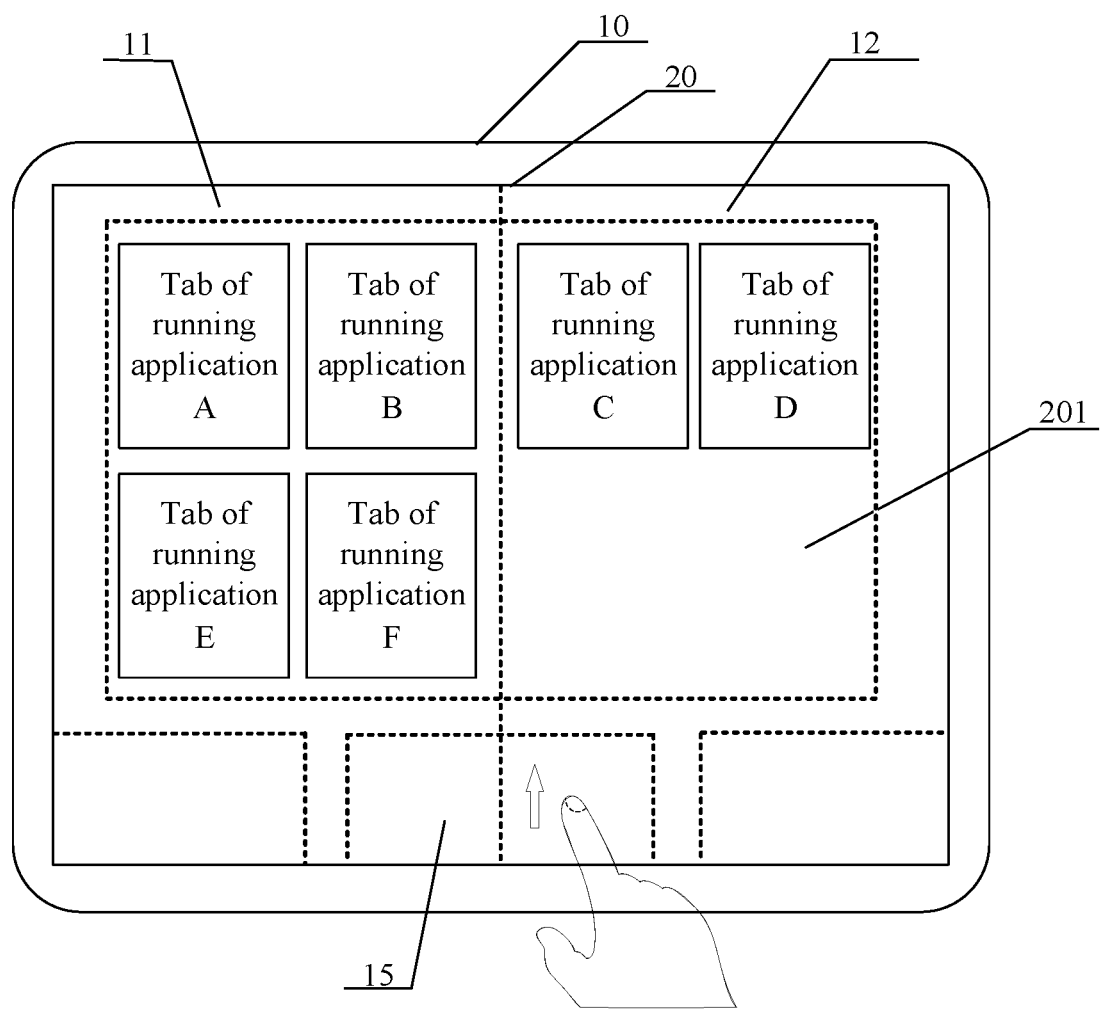
FIG. 14 shows a diagram of displaying a multi-task management interface when a touch operation is acted on a third response region, according to an example.

As illustrated in FIG. 14, described below, when a touch operation is acted on the third response region 15, the multi-task management interface 20 has only the task selection region 201 and no task storage region. A tab of each running application (including the first application and the second application) is displayed in the task selection region 201.

FIG. 14 is a structural diagram showing the front of a folding display screen 10. The first screen region 11 displaying tab of running application A, B, E, and F. The second screen region 12 displaying tab of running application C and D.

After the multi-task management interface is invoked, the user may select an application that needs to be switched to run in the foreground in the multi-task management interface, to display the interface of the application in the folding display screen.

When the touch operation is acted on the third response region, the multi-task management interface is displayed in the folding display screen in a full-screen display manner, and a tab of at least one running application is displayed in the task selection region of the multi-task management interface. The terminal obtains a selection instruction corresponding to the fourth application in the task selection region, where a user interface of the fourth application is displayed in the first screen region, the user interface of the fourth application is displayed in the second screen region, or the user interface of the fourth application is displayed in the folding display screen in a full-screen display manner.

According to an embodiment, when the fourth application is an application adapted to be displayed in a full-screen display manner, the terminal may display the user interface of the fourth application in the folding display screen in a full-screen display manner, and may also display the user interface of the fourth application in the first screen region or the second screen region based on the user's selection.

According to an embodiment, when only the desktop application in the system application is running in the foreground in the terminal, the terminal may display prompt information such as "no running application recently" in the folding display screen after receiving the touch operation in the response region, so as to inform the user that no other applications are running in the foreground and the background.

Some embodiments may allow, for a terminal with a folding display screen, a method for displaying a multi-task management interface is provided. After receiving a touch operation located in a first screen region or a second screen region of the folding display screen, the terminal displays the multi-task management interface based on the touch operation, without adopting a scheme in which a button in the center of the screen is traditionally required to be touched. In this way, the operation for invoking the multi-task management interface is made to be more convenient.

In addition, three response regions for responding to touch operations are disposed of in the folding display screen of the terminal, and different response regions correspond to different display modes of the multi-task management interface, thereby improving display flexibility of the multi-task management interface.

The following are device embodiments of the present disclosure, which may be used to implement the method embodiments of the present disclosure. Details not disclosed in the device embodiments of the present disclosure may be referred to as the method embodiments of the present disclosure.

Figure 15:
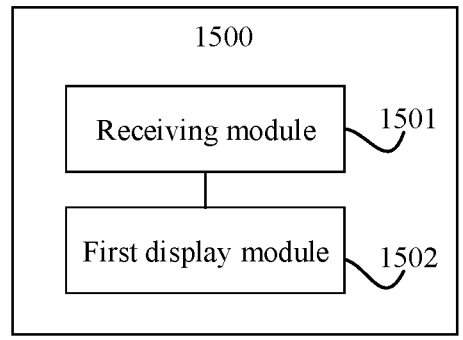
FIG. 15 is a block diagram of a device for displaying a multi-task management interface, according to an example.

FIG. 15 is a block diagram of a device for displaying a multi-task management interface according to an example. The device has functions of implementing the above-described method examples, and the functions may be implemented by hardware or by software executed by hardware correspondingly. The device may be a terminal, and may also be disposed on a terminal. The device 1500 may include a receiving module 1501 and a first display module 1502.

The receiving module 1501 is configured for receiving a touch operation acting on a target screen region, where the target screen region is the first screen region or the second screen region.

The first display module 1502 is configured to display a multi-task management interface based on the touch operation, where the multi-task management interface is configured to display at least one running an application that is in a running state.

Some embodiments may allow, for a terminal with a folding display screen, a method for displaying a multi-task management interface is provided. After receiving a touch operation located in a first screen region or a second screen region of the folding display screen, the terminal displays the multi-task management interface based on the touch operation, without adopting a scheme in which a button in the center of the screen is traditionally required to be touched. In this way, the operation for invoking the multi-task management interface is made to be more convenient.

In an alternative embodiment provided based on the embodiment of FIG. 15, the folding display screen includes a first response region and a second response region, which are configured for responding to the touch operation; Where the first response region is located in the first screen region, and the second response region is located in the second screen region.

According to an embodiment, the first response region includes a region enclosed by a bottom edge of the first screen region, a side edge of the first screen region, a first virtual edge parallel to the bottom edge of the first screen region, and a second virtual edge parallel to the side edge of the first screen region. According to an embodiment, the second response region includes a region enclosed by a bottom edge of the second screen region, a side edge of the second screen region, a third virtual edge parallel to the bottom edge of the second screen region and a fourth virtual edge parallel to the side edge of the second screen region.

In another alternative embodiment provided based on the embodiment of FIG. 15, the folding display screen includes a first response region, a second response region, and a third response region, which are configured for responding to the touch operation; Where the first response region is located in the first screen region, the second response region is located in the second screen region, one portion of the third response region is located in the first screen region, and the other portion is located in the second screen area, and the first response region, the second response region, and the third response region are not overlapped.

According to an embodiment, the first response region includes a region enclosed by a bottom edge of the first screen region, a side edge of the first screen region, a first virtual edge parallel to the bottom edge of the first screen region, and a second virtual edge parallel to the side edge of the first screen region;

According to an embodiment, the second response region includes a region enclosed by a bottom edge of the second screen region, a side edge of the second screen region, a third virtual edge parallel to the bottom edge of the second screen region and a fourth virtual edge parallel to the side edge of the second screen region;

The third response region includes a region enclosed by a bottom edge of the folding display screen, a fifth virtual edge located in the first screen region, a sixth virtual edge located in the second screen region and a seventh virtual edge parallel to the bottom edge of the folding display screen region.

According to an embodiment, a user interface of a first application is displayed in the first screen region, and a user interface of a second application is displayed in the second screen region;

The first display module 1502 is configured for:

When the touch operation is acted on the first response region, displaying the multi-task management interface in the folding display screen in a full-screen display manner, displaying a tab of at least one running application except for the second application in a task selection region of the multi-task management interface, and displaying a tab of the second application in a task storage region of the multi-task management interface, where the task storage region is located in the second screen region;

When the touch operation is acted on the second response region, displaying the multi-task management interface in the folding display screen in a full-screen display manner, displaying a tab of at least one running application except for the first application in a task selection region of the multi-task management interface, and displaying a tab of the first application in a task storage region of the multi-task management interface, where the task storage region is located in the first screen region.

Figure 16:
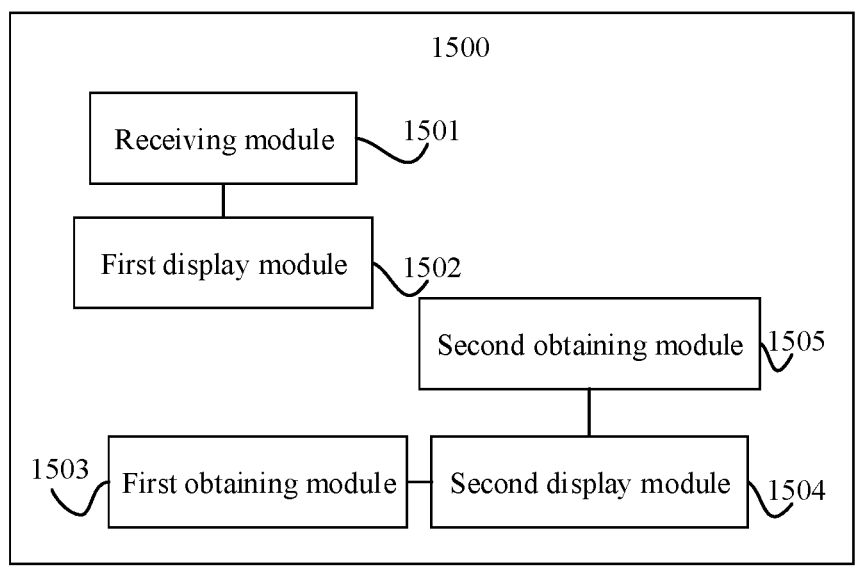
FIG. 16 is a block diagram of a device for displaying a multi-task management interface, according to an example.

FIG. 16 is a block diagram of a device for displaying a multi-task management interface according to an example. The device 1500 further includes a first obtaining module 1503 and a second display module 1504.

The first obtaining module 1503 is configured for obtaining a selection instruction corresponding to a third application in the task selection region.

The second displaying module 1504 is configured for, when the touch operation is acted on the first response region, displaying a user interface of a third application in the first screen region, and displaying the user interface of the second application in the second screen region.

The second displaying module 1504 is further configured for, when the touch operation is acted on the second response region, displaying a user interface of a third application in the second screen region, and displaying the user interface of the first application in the first screen region.

According to an embodiment, the first display module 1502 is further configured for, when the touch operation is acted on the third response region, displaying the multi-task management interface in the folding display screen in a full-screen display manner, and displaying a tab of at least one running application in the task selection region of the multi-task management interface.

According to an embodiment, as illustrated in FIG. 16, the device 1500 further includes a second obtaining module 1505.

The second obtaining module 1505 is configured for obtaining a selection instruction corresponding to a fourth application in the task selection region.

The second display module 1504 is configured to display a user interface of the fourth application in the first screen region, displaying the user interface of the fourth application in the second screen region, or displaying the user interface of the fourth application in the folding display screen in a full-screen display manner.

It is to be noted that the device provided in the above embodiment is only illustrated by the division of each of the above function modules when implementing its functions. In practical applications, the above function allocation may be completed by different function modules as needed, that is, the internal structure of the device is divided into different function modules to complete all or part of the functions described above. In addition, the device provided in the foregoing embodiments is the same as the method embodiments, and the specific implementation process is described in the method embodiment, and details are not described herein again.

Examples of the present disclosure further provide a terminal with a folding display screen including a first screen region and a second screen region that are foldable, which can implement a display method of the multi-task management interface provided by the present disclosure. The terminal includes a processor and a memory configured for storing instructions executable by the processor. Where the processor is configured for:

Receiving a touch operation acting on a target screen region, where the target screen region is the first screen region or the second screen region;

Displaying a multi-task management interface based on the touch operation, where the multi-task management interface is configured to display at least one running an application that is in a running state.

According to an embodiment, the folding display screen includes a first response region and a second response region, which are configured for responding to the touch operation; Where the first response region is located in the first screen region, and the second response region is located in the second screen region.

According to an embodiment, the first response region includes a region enclosed by a bottom edge of the first screen region, a side edge of the first screen region, a first virtual edge parallel to the bottom edge of the first screen region, and a second virtual edge parallel to the side edge of the first screen region; According to an embodiment, the second response region includes a region enclosed by a bottom edge of the second screen region, a side edge of the second screen region, a third virtual edge parallel to the bottom edge of the second screen region and a fourth virtual edge parallel to the side edge of the second screen region.

According to an embodiment, the folding display screen includes a first response region, a second response region and a third response region, which are configured for responding to the touch operation; Where the first response region is located in the first screen region, the second response region is located in the second screen region, one portion of the third response region is located in the first screen region, and the other portion is located in the second screen area, and the first response region, the second response region, and the third response region are not overlapped.

According to an embodiment, the first response region includes a region enclosed by a bottom edge of the first screen region, a side edge of the first screen region, a first virtual edge parallel to the bottom edge of the first screen region, and a second virtual edge parallel to the side edge of the first screen region;

According to an embodiment, the second response region includes a region enclosed by a bottom edge of the second screen region, a side edge of the second screen region, a third virtual edge parallel to the bottom edge of the second screen region and a fourth virtual edge parallel to the side edge of the second screen region;

The third response region includes a region enclosed by a bottom edge of the folding display screen, a fifth virtual edge located in the first screen region, a sixth virtual edge located in the second screen region and a seventh virtual edge parallel to the bottom edge of the folding display screen region.

According to an embodiment, a user interface of a first application is displayed in the first screen region, and a user interface of a second application is displayed in the second screen region;

The processor is configured for: When the touch operation is acted on the first response region, displaying the multi-task management interface in the folding display screen in a full-screen display manner, displaying a tab of at least one running application except for the second application in a task selection region of the multi-task management interface, and displaying a tab of the second application in a task storage region of the multi-task management interface, where the task storage region is located in the second screen region; When the touch operation is acted on the second response region, displaying the multi-task management interface in the folding display screen in a full-screen display manner, displaying a tab of at least one running application except for the first application in a task selection region of the multi-task management interface, and displaying a tab of the first application in a task storage region of the multi-task management interface, where the task storage region is located in the first screen region.

According to an embodiment, the processor is further configured for obtaining selection instruction corresponding to a third application in the task selection region; when the touch operation is acted on the first response region, a user interface of a third application is displayed in the first screen region, and the user interface of the second application is displayed in the second screen region; when the touch operation is acted on the second response region, the user interface of the third application is displayed in the second screen region, and the user interface of the first application is displayed in the first screen region.

According to an embodiment, the processor is further configured for, when the touch operation is acted on the third response region, displaying the multi-task management interface in the folding display screen in a full-screen display manner, and displaying a tab of at least one running application in the task selection region of the multi-task management interface.

According to an embodiment, the processor is further configured for obtaining a selection instruction corresponding to the fourth application in the task selection region, where a user interface of the fourth application is displayed in the first screen region, the user interface of the fourth application is displayed in the second screen region, or the user interface of the fourth application is displayed in the folding display screen in a full-screen display manner.

Figure 17:
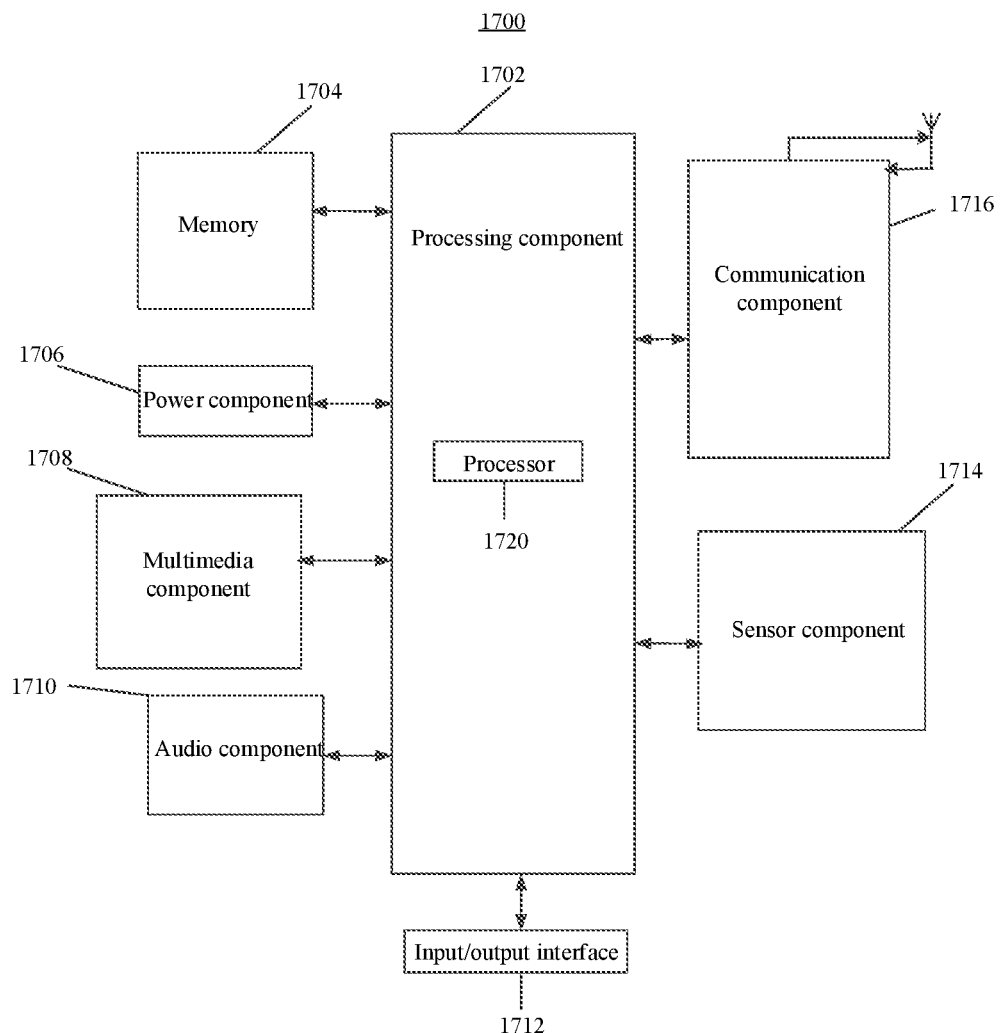
FIG. 17 is a block diagram of a terminal, according to an example.

FIG. 17 is a block diagram of a terminal 1700 according to an example. The terminal has a folding display screen. For example, the terminal 1700 may be an electronic device such as a cellphone, a tablet computer, an e-book reader, a multimedia playback device, a wearable device, a portable laptop computer, or the like.

The terminal 1700 may include one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 typically controls the overall operations of terminal 1700, such as operations associated with the display, telephone calls, data communications, camera operations, and recording operations. The processing component 1702 may include one or more processors 1720 to execute instructions to perform all or part of the steps of the above-described methods. Moreover, the processing component 1702 may include one or more modules to facilitate interaction between the processing component 1702 and other components. For example, the processing component 1702 may include a multimedia module to facilitate interaction between the multimedia component 1708 and the processing component 1702.

The memory 1704 is configured for storing various types of data to support operations at the terminal 1700. Examples of these data include instructions for any application or method operating on the terminal 1700, contact data, phone book data, messages, pictures, videos, and the like. The memory 1704 may be implemented by any type of volatile or non-volatile storage device, or a combination thereof, such as static random access memory (SRAM), electrically erasable programmable read only memory (EEPROM), erasable programmable read-only memory (EPROM), programmable read-only memory (PROM), read-only memory (ROM), magnetic memory, flash memory, disk or optical disk.

The power component 1706 provides power to various components of the terminal 1700. The power component 1706 may include a power management system, one or more power sources, and other components associated with generating, managing, and distributing power for the terminal 1700.

The multimedia component 1708 includes a screen between the terminal 1700 and a user, which provides an output interface. In some embodiments, the screen may include a liquid crystal display (LCD) and a touch panel (TP). If the screen includes a touch panel, the screen may be implemented as a touch screen for receiving input signals from a user. The touch panel includes one or more touch sensors for sensing touches, slides, and gestures on the touch panel. The touch sensor may sense not only the boundary of the touch or sliding action but also the duration and pressure associated with the touch or slide operation. In some embodiments, the multimedia component 1708 includes a front camera and/or a rear camera. When the terminal 1700 is in an operation mode, such as a shooting mode or a video mode, the front camera and/or the rear camera may receive external multimedia data. Each of the front camera and the rear camera may be a fixed optical lens system or have focal length and optical zoom capabilities.

The audio component 1710 is configured for outputting and/or inputting an audio signal. For example, the audio component 1710 includes a microphone (MIC) that is configured for receiving an external audio signal when the terminal 1700 is in an operational mode, such as a call mode, a recording mode, and a voice recognition mode. The received audio signal may be further stored in the memory 1704 or transmitted via the communication component 1716. In some embodiments, the audio component 1710 also includes a speaker for outputting an audio signal.

The I/O interface 1712 provides an interface between the processing component 1702 and a peripheral interface module, which may be a keyboard, a click wheel, a button, or the like. These buttons may include but are not limited to, a home button, a volume button, a start button, and a lock button.

The sensor component 1714 includes one or more sensors for providing the terminal 1700 with various aspects of the state assessment. For example, the sensor assembly 1714 may detect the open/closed state of the terminal 1700, the relative positioning of the components such as the display and keypad of the terminal 1700, and the sensor component 1714 may also detect a change in position of the terminal 1700 or that of one component of the terminal 1700, the presence or absence of contact of the user with the terminal 1700, the orientation or acceleration/deceleration of the terminal 1700, and the temperature change of the terminal 1700. The sensor assembly 1714 may include a proximity sensor configured for detecting the presence of nearby objects without any physical contact. The sensor assembly 1714 may also include a light sensor, such as a CMOS or CCD image sensor, for use in imaging applications. In some embodiments, the sensor component 1714 may also include an acceleration sensor, a gyro sensor, a magnetic sensor, a pressure sensor, or a temperature sensor.

The communication component 1716 is configured to facilitate wired or wireless communication between the terminal 1700 and other devices. The terminal 1700 may access a wireless network based on a communication standard, such as Wi-Fi, 2G, 3G, 4G, 5G, or a subsequent evolution system, or a combination thereof. In an example, the communication component 1716 receives broadcast signals or broadcast associated information from an external broadcast management system via a broadcast channel. In an example, the communication component 1716 further includes a near field communication (NFC) module for facilitating short-range communication. For example, the NFC module may be implemented based on radio frequency identification (RFID) technology, infrared data association (IrDA) technology, ultra-wideband (UWB) technology, Bluetooth (BT) technology and other technologies.

In an example, the terminal 1700 may be implemented by one or more application-specific integrated circuits (ASICs), digital signal processors (DSPs), digital signal processing devices (DSPDs), programmable logic devices (PLDs), field-programmable gate array (FPGA), controllers, microcontrollers, microprocessors or other electronic components, for performing the method for displaying the above multi-task management interface.

In an example, a non-transitory computer-readable storage medium on which computer programs 17 are stored. The computer programs may be executable by the processor 1720 of the terminal 1700 to perform the method for displaying the multi-task management interface described above. For example, the non-transitory computer-readable storage medium may be a ROM, a random access memory (RAM), a CD-ROM, a magnetic tape, a floppy disk, an optical data storage device, and the like It is to be understood that "a plurality" as referred to herein refers to two or more. "And/or," describing the association relationship of the associated objects, indicates that there may be three relationships, for example, A and/or B, which may indicate that there are three cases where A exists separately, A and B exist at the same time, and B exists separately. The character "/" generally indicates that the contextual object is an "or" relationship.

The above description is only examples of the present disclosure and is not intended to limit the invention, and any modifications, equivalents, improvements, etc., made within the spirit and principles of the present disclosure should be included within the scope of protection of the present disclosure.

What is claimed is:

1. A method for displaying a multi-task management interface, the method being executed by a terminal with a folding display screen comprising a first screen region and a second screen region, the method comprising:
displaying a user interface of a first application in full screen in the first screen region and a user interface of a second application in full screen in the second screen region;
receiving a touch operation acting on a target screen region, wherein the target screen region is a screen region on the folding display screen; and
displaying the multi-task management interface based on the touch operation, the multi-task management interface being configured to display at least one running application that is in a running state,
wherein the folding display screen comprises a first response region, a second response region, and a third response region, which are configured to respond to the touch operation, wherein the third response region comprises a flexible screen and at least one of the first screen region and the second screen region comprises a rigid screen,
wherein the first response region is located in the first screen region, the second response region is located in the second screen region, and a portion of the third response region is located in the first screen region and the other portion is located in the second screen region, wherein the third response region is arranged between the first response region and the second response region, and the third response region does not contact with the first response region and the second response region, and
wherein displaying the multi-task management interface based on the touch operation comprises:
when the touch operation is acted on the first response region, displaying, in full screen, the multi-task management interface in the folding display screen, displaying a tab of at least one running application except for the second application in a task selection region of the multi-task management interface, and displaying only a tab of the second application in a task storage region of the multi-task management interface, the task storage region being located in the second screen region; and
when the touch operation is acted on the second response region, displaying, in full screen, the multi-task management interface in the folding display screen, displaying a tab of at least one running application except for the first application in the task selection region of the multi-task management interface, and displaying only a tab of the first application in the task storage region of the multi-task management interface, the task storage region being located in the first screen region.

2. The method of claim 1, wherein:
the first response region comprises a region enclosed by a bottom edge of the first screen region, a side edge of the first screen region, a first virtual edge parallel to the bottom edge of the first screen region, and a second virtual edge parallel to the side edge of the first screen region;
the second response region comprises a region enclosed by a bottom edge of the second screen region, a side edge of the second screen region, a third virtual edge parallel to the bottom edge of the second screen region, and a fourth virtual edge parallel to the side edge of the second screen region; and
the third response region comprises a region enclosed by a bottom edge of the folding display screen, a fifth virtual edge located in the first screen region, a sixth virtual edge located in the second screen region, and a seventh virtual edge parallel to the bottom edge of the folding display screen region.

3. The method of claim 1, wherein displaying the multi-task management interface based on the touch operation comprises:
if the touch operation is acted on the third response region, displaying, in full screen, the multi-task management interface in the folding display screen, and displaying a tab of at least one running application in a task selection region of the multi-task management interface.

4. The method of claim 3, further comprising:
obtaining a selection instruction corresponding to a fourth application in the task selection region; and
displaying a user interface of the fourth application in the first screen region, or displaying the user interface of the fourth application in the second screen region, or displaying, in full screen, the user interface of the fourth application in the folding display screen.

5. The method of claim 1, wherein:
the first response region comprises a region enclosed by a bottom edge of the first screen region, a side edge of the first screen region, a first virtual edge parallel to the bottom edge of the first screen region, and a second virtual edge parallel to the side edge of the first screen region; and the second response region comprises a region enclosed by a bottom edge of the second screen region, a side edge of the second screen region, a third virtual edge parallel to the bottom edge of the second screen region and a fourth virtual edge parallel to the side edge of the second screen region.

6. The method of claim 1, further comprising:

obtaining a selection instruction corresponding to a third application in the task selection region;

when the touch operation is acted on the first response region, displaying a user interface of a third application in the first screen region, and displaying the user interface of the second application in the second screen region; and when the touch operation is acted on the second response region, displaying the user interface of the third application in the second screen region, and displaying the user interface of the first application in the first screen region.

7. A device for displaying a multi-task management interface, the device being applied in a terminal with a folding display screen comprising a first screen region and a second screen region, the device comprising:

one or more processors; and tangible, non-transitory computer-readable memory configured to store an instruction executable by the one or more processors, wherein the terminal is configured to:

display a user interface of a first application in full screen in the first screen region and a user interface of a second application in full screen in the second screen region;

receive a touch operation acting on a target screen region, the target screen region being a screen region on the folding display screen; wherein the folding display region can have one more screen regions; and display the multi-task management interface based on the touch operation, the multi-task management interface being configured to display at least one running application that is in a running state, wherein the folding display screen comprises a first response region, a second response region and a third response region, which are configured to respond to the touch operation, wherein the third response region comprises a flexible screen and at least one of the first screen region and the second screen region comprises a rigid screen, wherein the first response region is located in the first screen region, the second response region is located in the second screen region, and a portion of the third response region is located in the first screen region and the other portion is located in the second screen region, wherein the third response region is arranged between the first response region and the second response region, and the third response region does not contact with the first response region and the second response region, and wherein in order to display the multi-task management interface based on the touch operation, the processor is configured to:

when the touch operation is acted on the first response region, display, in full screen, the multi-task management interface in the folding display screen, display a tab of at least one running application except for the second application in a task selection region of the multi-task management interface, and display only a tab of the second application in a task storage region of the multi-task management interface, the task storage region being located in the second screen region;

when the touch operation is acted on the second response region, display, in full screen, the multi-task management interface in the folding display screen, display a tab of at least one running application except for the first application in the task selection region of the multi-task management interface, and display only a tab of the first application in the task storage region of the multi-task management interface, the task storage region being located in the first screen region.

8. The device of claim 7, wherein:

the first response region comprises a region enclosed by a bottom edge of the first screen region, a side edge of the first screen region, a first virtual edge parallel to the bottom edge of the first screen region and a second virtual edge parallel to the side edge of the first screen region;

the second response region comprises a region enclosed by a bottom edge of the second screen region, a side edge of the second screen region, a third virtual edge parallel to the bottom edge of the second screen region and a fourth virtual edge parallel to the side edge of the second screen region; and the third response region comprises a region enclosed by a bottom edge of the folding display screen, a fifth virtual edge located in the first screen region, a sixth virtual edge located in the second screen region and a seventh virtual edge parallel to the bottom edge of the folding display screen region.

9. The device of claim 7, wherein in order to display the multi-task management interface based on the touch operation, the processor is configured to:

when the touch operation is acted on the third response region, display, in full screen, the multi-task management interface in the folding display screen, and display a tab of at least one running application in the task selection region of the multi-task management interface.

10. The device of claim 9, wherein the terminal is further configured to:

obtain a selection instruction corresponding to a fourth application in the task selection region; and display a user interface of the fourth application in the first screen region, or display the user interface of the fourth application in the second screen region, or display, in full screen, the user interface of the fourth application in the folding display screen.

11. The device of claim 7, wherein the first response region comprises a region enclosed by a bottom edge of the first screen region, a side edge of the first screen region, a first virtual edge parallel to the bottom edge of the first screen region, and a second virtual edge parallel to the side edge of the first screen region; and the second response region comprises a region enclosed by a bottom edge of the second screen region, a side edge of the second screen region, a third virtual edge parallel to the bottom edge of the second screen region and a fourth virtual edge parallel to the side edge of the second screen region.

12. The device of claim 7, wherein the terminal is further configured to:
   obtain a selection instruction corresponding to a third application in the task selection region;
   when the touch operation is acted on the first response region, display a user interface of a third application in the first screen region, and display the user interface of the second application in the second screen region; and
   when the touch operation is acted on the second response region, display a user interface of a third application in the second screen region, and display the user interface of the first application in the first screen region.

13. A tangible, non-transitory computer readable storage medium having stored thereon computer programs that, when executed by one or more processors, cause the one or more processors to implement steps of a method for displaying a multi-task management interface, the method being executed by a terminal with a folding display screen comprising a first screen region and a second screen region, the method comprising:
   displaying a user interface of a first application in full screen in the first screen region and a user interface of a second application in full screen in the second screen region;
   receiving a touch operation acting on a target screen region, the target screen region being a screen region; and
   displaying the multi-task management interface based on the touch operation, the multi-task management interface being configured to display at least one running application that is in a running state,
   wherein the folding display screen comprises a first response region, a second response region and a third response region, which are configured to respond to the touch operation, wherein the third response region comprises a flexible screen and at least one of the first screen region and the second screen region comprises a rigid screen,
   wherein the first response region is located in the first screen region, the second response region is located in the second screen region, and a portion of the third response region is located in the first screen region and the other portion is located in the second screen region,
   wherein the third response region is arranged between the first response region and the second response region, and the third response region does not contact with the first response region and the second response region, and
   wherein displaying the multi-task management interface based on the touch operation comprises:
   when the touch operation is acted on the first response region, displaying, in full screen, the multi-task management interface in the folding display screen, displaying a tab of at least one running application except for the second application in a task selection region of the multi-task management interface, and displaying only a tab of the second application in a task storage region of the multi-task management interface, the task storage region being located in the second screen region; and
   when the touch operation is acted on the second response region, displaying, in full screen, the multi-task management interface in the folding display screen, displaying a tab of at least one running application except for the first application in the task selection region of the multi-task management interface, and displaying only a tab of the first application in the task storage region of the multi-task management interface, the task storage region being located in the first screen region.

* * * * *